US008651555B2

(12) United States Patent  (10) Patent No.: US 8,651,555 B2
Chan  (45) Date of Patent: Feb. 18, 2014

(54) STRUCTURE FOR CAR COVER

(76) Inventor: Wei-Hao Chan, Taichung (TW)

( * ) Notice: Subject to any disclaimer, the term of this patent is extended or adjusted under 35 U.S.C. 154(b) by 1 day.

(21) Appl. No.: 13/205,616

(22) Filed: Aug. 8, 2011

(65) Prior Publication Data

US 2013/0038085 A1  Feb. 14, 2013

(51) Int. Cl.
*B60J 11/04*  (2006.01)
(52) U.S. Cl.
USPC ............... 296/136.13; 296/136.12; 150/166; 52/DIG. 14
(58) Field of Classification Search
USPC ........... 296/136.12, 136.13, 136.01; 150/166, 150/167; 52/DIG. 14
See application file for complete search history.

(56) References Cited

U.S. PATENT DOCUMENTS 5,795,012 A * 8/1998 Liou et al. ............... 296/136.13
6,935,674 B1 * 8/2005 Campos ........................ 296/98
7,562,928 B1 * 7/2009 Morazan .................. 296/136.01
2006/0162873 A1 * 7/2006 Dao ............................. 160/122

* cited by examiner

*Primary Examiner* — Glenn Dayoan
*Assistant Examiner* — Melissa A Black (57) ABSTRACT

An improved structure for car cover comprises a main unit with a compartment inside and multiple conduits for the external connectivity for the main unit, and a transmission component that can be driven by external power supply and is located inside the compartment of the main unit, and multiple passive components located at the peripheral of the transmission component inside the compartment to allow synchronous movement, and at least one wire duct on each passive component for a flexible elastic cable to wrap around, and an active end on each flexible elastic cable to pass through a conduit to outside of the compartment, and multiple link mechanisms that are composed of multiple links and use one end to connect to the main unit and the other end to connects to an active end of a different flexible elastic cable, and a soft piece of shield that is attached to the multiple link mechanisms and able to varies with the length of the multiple link mechanisms to change the coverage area.

19 Claims, 9 Drawing Sheets

STRUCTURE FOR CAR COVER

BACKGROUND OF THE INVENTION

1. Field of the Invention

The invention is related to an improved structure for car cover. Especially, it refers to a structure for car cover that has easy operation and multiple functions.

2. Description of the Prior Art

With the growth of automotive industry and increasing demand of convenient transportation, the popularity of cars is also increasing. However, due to the restraints by the crowdedness of busy modern societies, there is a severe lack of parking space. Many car owners have to park their cars outside temporarily or permanently. Thus, pollutants like dusts, rainwater and bird's dropping can fall on car surface to damage car finishes. Besides, the heat from sunlight can increase the temperature of car interiors to lower the comfort level and damage car interior parts. Therefore, car cover products are constantly developed and publicized. For example, Republic of China patent publication no. M281818 for "Umbrella Type Tri-functional Car Cover" mainly comprises: a car top base and an umbrella cover. The car top base is a rectangle frame and conformal to car top shape. At each corner of the bottom of the car top base, there is a strong magnet to allow the attachment of the car top base to a car top. Above the car top base, there are two reverse L-shape rails to accommodate an umbrella base, which comprises a square base with a shaft in the center. A turning plate is screwed to the shaft and able to adjust the distance between the shaft and the base plate and provide fixation to the base plate by turning up and down along the shaft. The umbrella cover is a piece of square fabric with an attached string by elastic tape at both ends and a metal hook is attached to the elastic tape through which the car top base is fastened to a car top. At parking a car, the umbrella base is placed in the two rails and the square umbrella is on the shaft. By adjustment of the position of the umbrella base, it is moved to the center of car top and provided fixation. The installation is finally completed by attaching the two pieces of fabric through connecting the metal hooks to wheel covers or bumper. In practical applications, this can be used together with large sun-shield umbrella and tent. However, although such a structure provides multiple functions, it operation is complicated and lacks convenience.

Another Republic of China patent publication, M310927, "Dual Structure for Car Cover and Tent", mainly comprises a top base, a bottom base and several sets of support frames for fabric opening and closing. In the center of the top base and the bottom base, there are corresponding shafts and accommodation groove. At the exterior, there are fasteners and fastening grooves. When the top base and the bottom base are combined, the support frame will open up the fabric outward. In reverse action, the fabric will be closed. Suction cups on the support frame allows attachment to car top. This structure can be used as tent by converting bottom base, shaft base and support rod. However, such a structure is bulky and complicated to operate. It also lacks operational convenience.

In view of the shortcomings associated with traditional car cover, the inventor has sought improvement and came out with the invention.

SUMMARY OF THE INVENTION

The primary objective for the invention is to provide an improved structure for car cover that possesses ease of use and operational convenience.

Another objective for the invention is to provide an improved structure for car cover that can also function as outdoor shield when it is used together a support tripod to be multi-functional.

To attain the above objectives and functions, the technical approaches adopted by the invention include: a main unit with a compartment and a conduit at each corner of the main unit to provide the compartment with external connectivity; a transmission component that can be driven by external power supply and is located inside the compartment of the main unit. The transmission component has at least one drive unit that can be driven by the power supply and multiple passive components located at the peripheral of the transmission component inside the compartment. On each passive component, there are at least one driven unit and one wire duct. Thus, each driven unit can connect with the drive unit of the transmission component to move synchronously. The wire duct is available for a flexible elastic cable to wrap around. Each flexible elastic cable has an active end to pass through a conduit to outside of the compartment. There are multiple link mechanisms that are composed of multiple links. The link mechanism uses one end to connect to the main unit. The other end of the link mechanism connects to an active end of a different flexible elastic cable. This enables synchronous movement of the link mechanism by every flexible elastic cable and allows extension and shrinkage in length. There is a soft piece of shield that is attached to the multiple link mechanisms for covering the whole car and able to varies with the length of the multiple link mechanisms to change the coverage area.

According to the above mentioned structure, at the bottom of the main unit there is a support tripod on the ground.

According to the above mentioned structure, at the bottom of the main unit there is a support frame on car top.

According to the above mentioned structure, at the bottom of the main unit there is a battery as power supply.

According to the above mentioned structure, the drive unit of the transmission component and the driven unit of each passive component are matching gears.

According to the above mentioned structure, the links of the link mechanism are arranged in a repetitive bending fashion. Besides, between links there is a connecting component.

According to the above mentioned structure, the link mechanism is composed of multiple longer first links and multiple shorter second links. In each first link there is a hollow accommodating unit to accommodate the second link.

According to the above mentioned structure, on some of the connecting components close to the flexible elastic cable there is a ring unit, which is put on the flexible elastic cable.

According to the above mentioned structure, the length of the outward extending flexible elastic cable from the conduit is shorter than the link mechanism.

For the detailed structure, application principle, function and performance for the invention, please refer to the appendix figures for complete understanding.

DETAILED DESCRIPTION OF THE INVENTION

Figure 1:
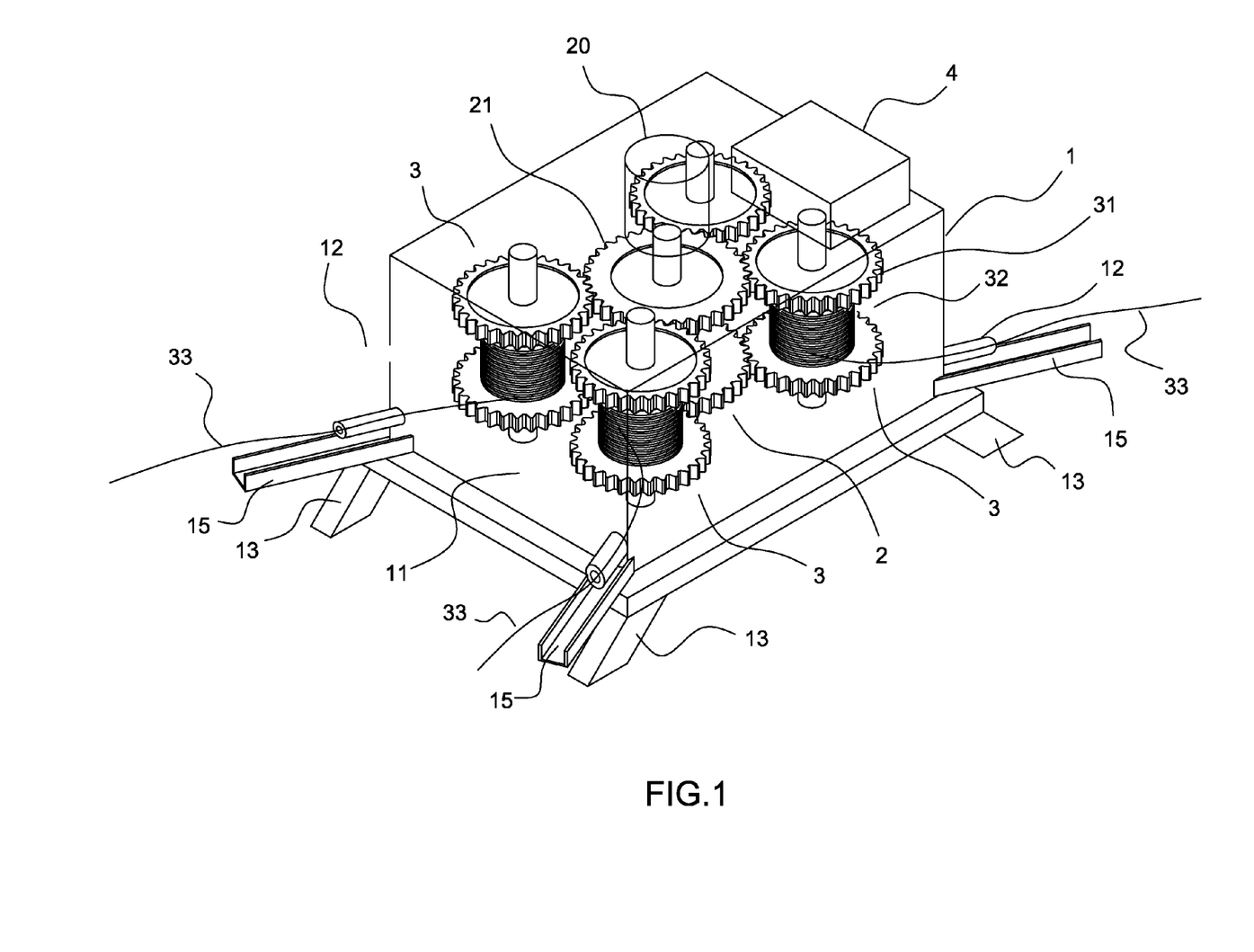
FIG. 1 is a structural diagram for the main unit and related components for the first embodiment of the invention.
Figure 2:
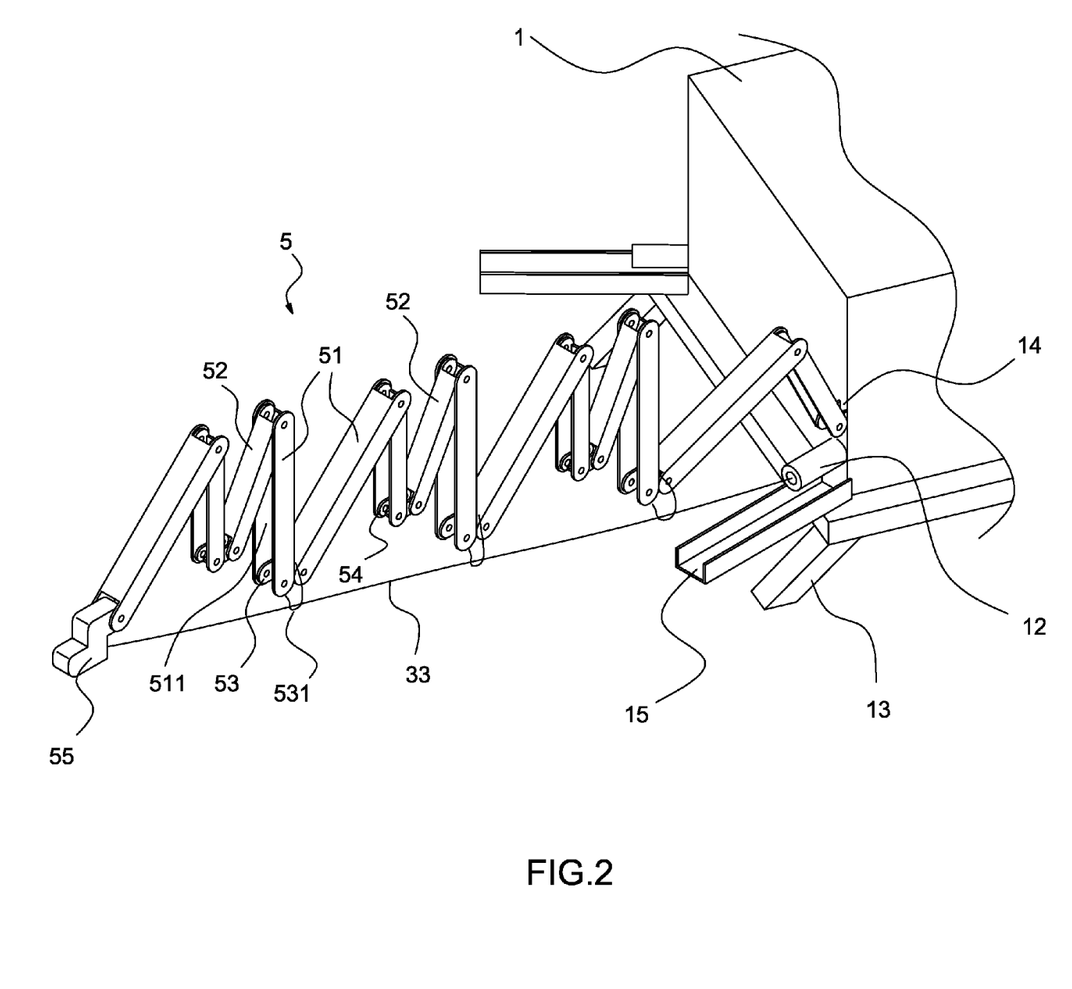
FIG. 2 is a structural diagram for the link mechanism and related components for the first embodiment of the invention.
Figure 3:
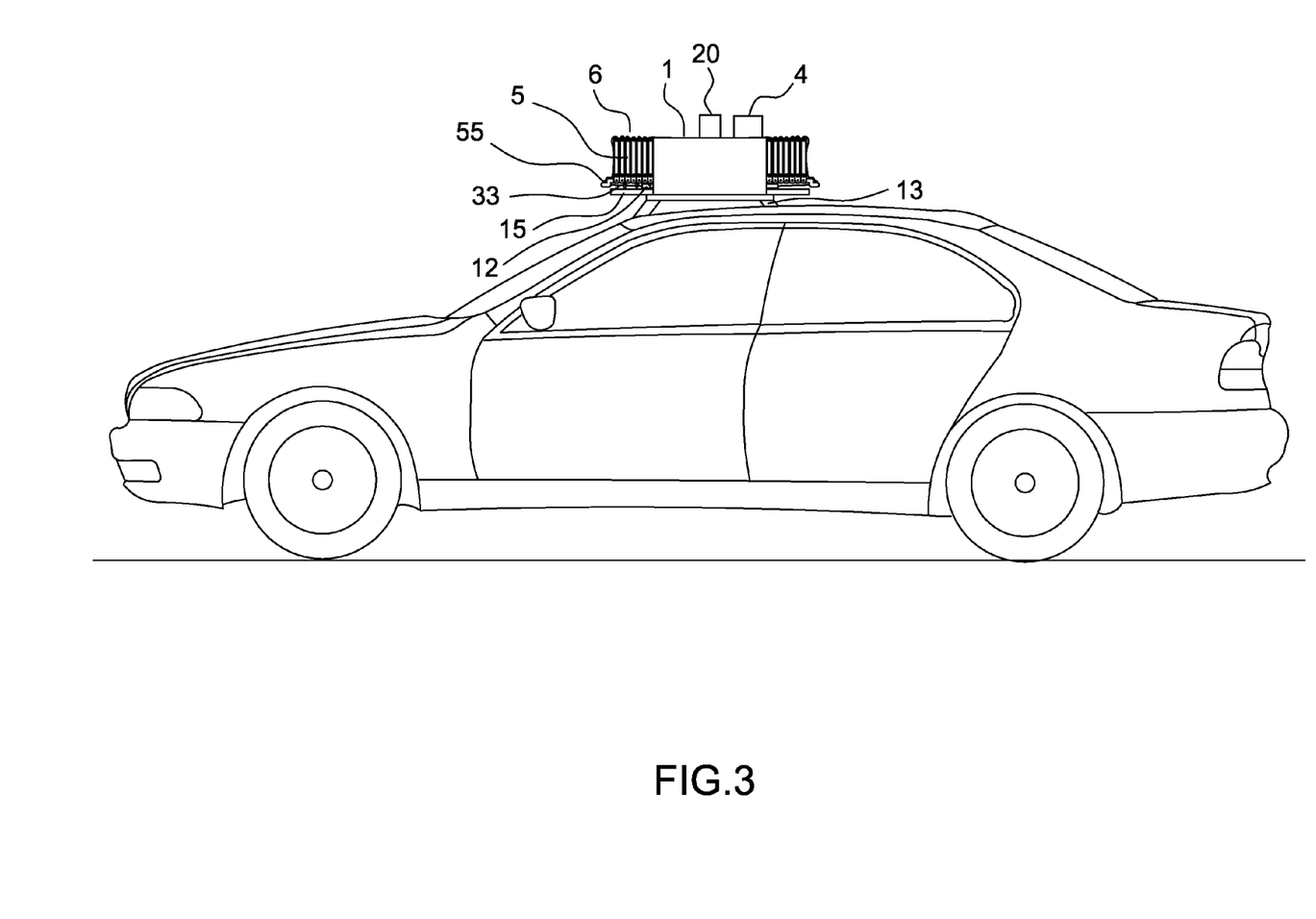
FIG. 3 is the side-view diagram to show the closure state of the first embodiment of the invention.
Figure 4:
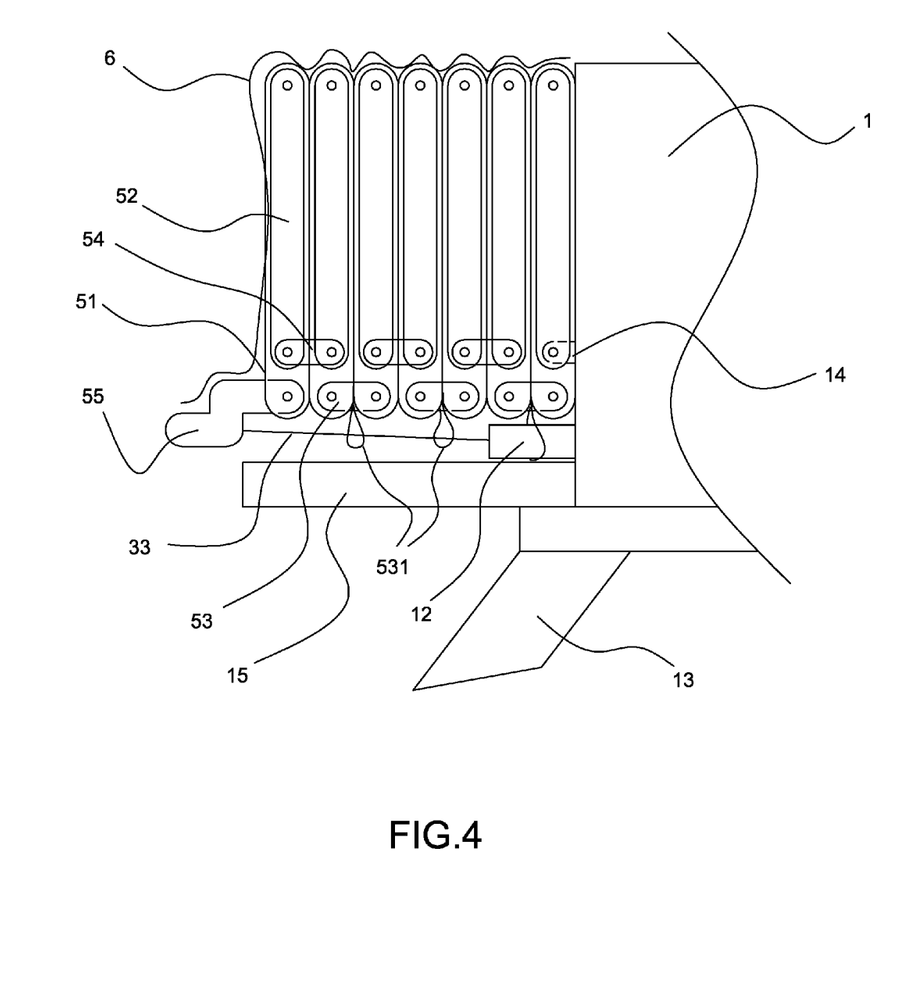
FIG. 4 is the enlargement of the link mechanism in FIG. 3.
Figure 5:
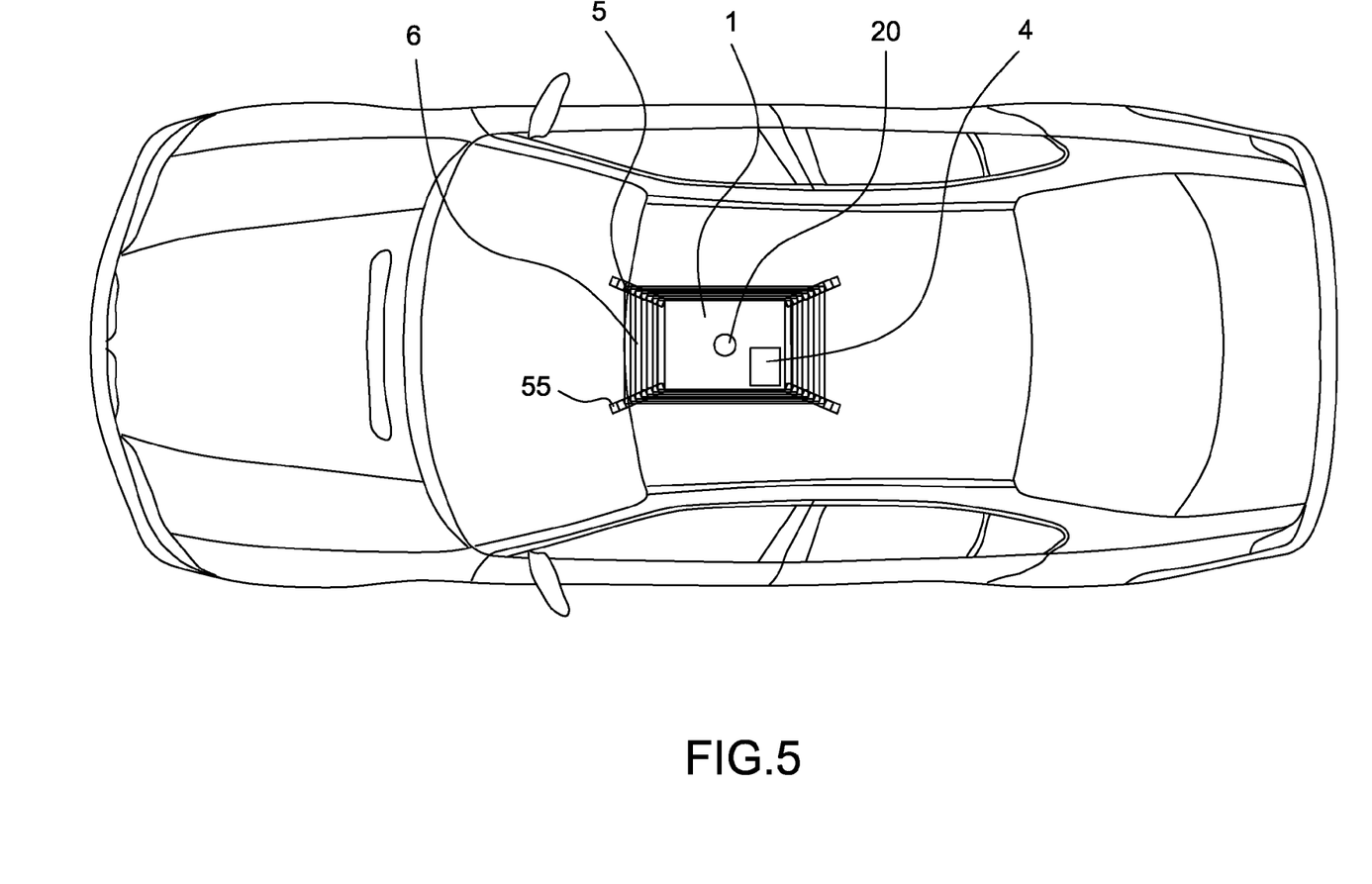
FIG. 5 is the top-view diagram to show the closure state of the first embodiment of the invention.
Figure 6:
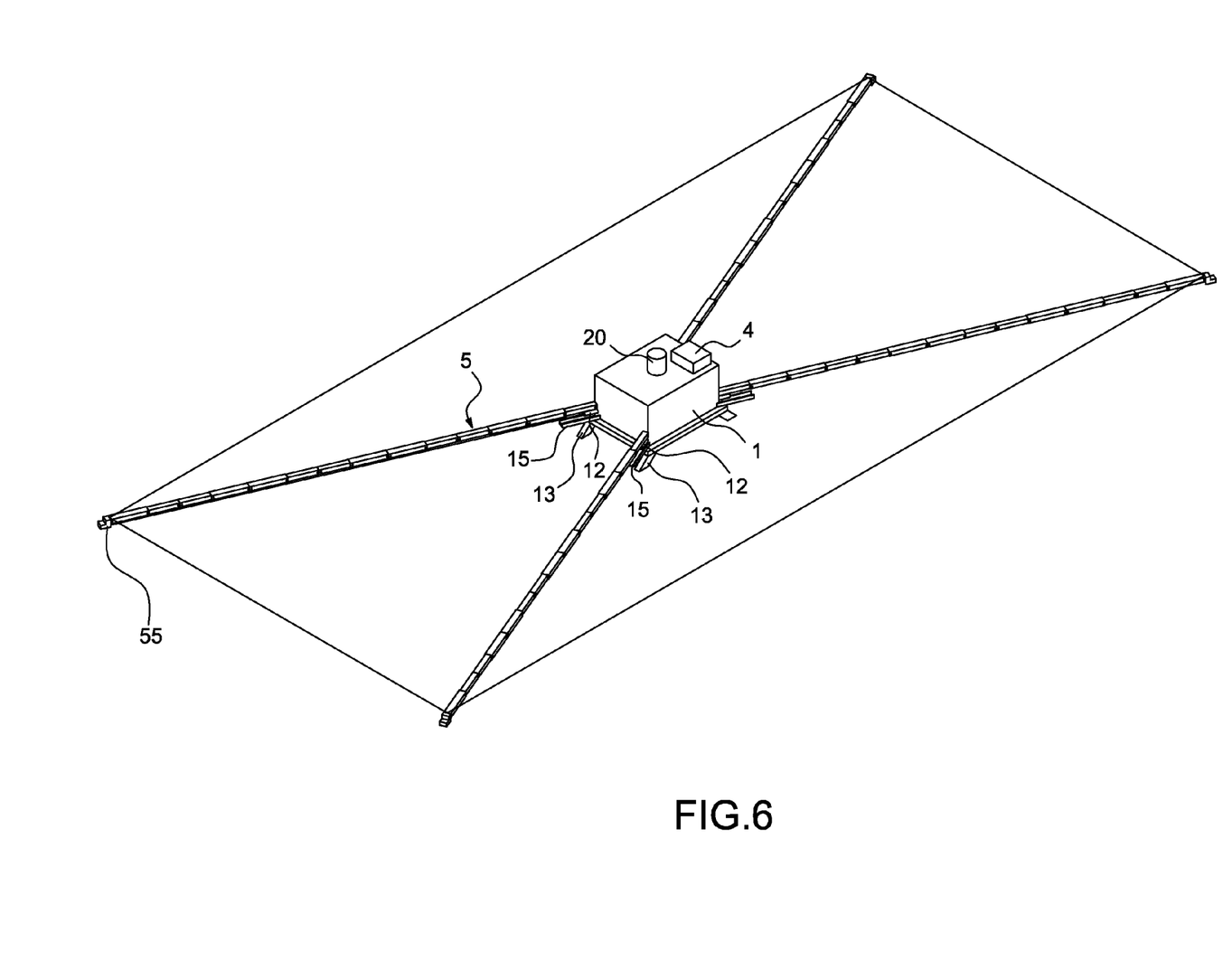
FIG. 6 is the overall exterior view diagram to show the opening state of the first embodiment of the invention.
Figure 7:
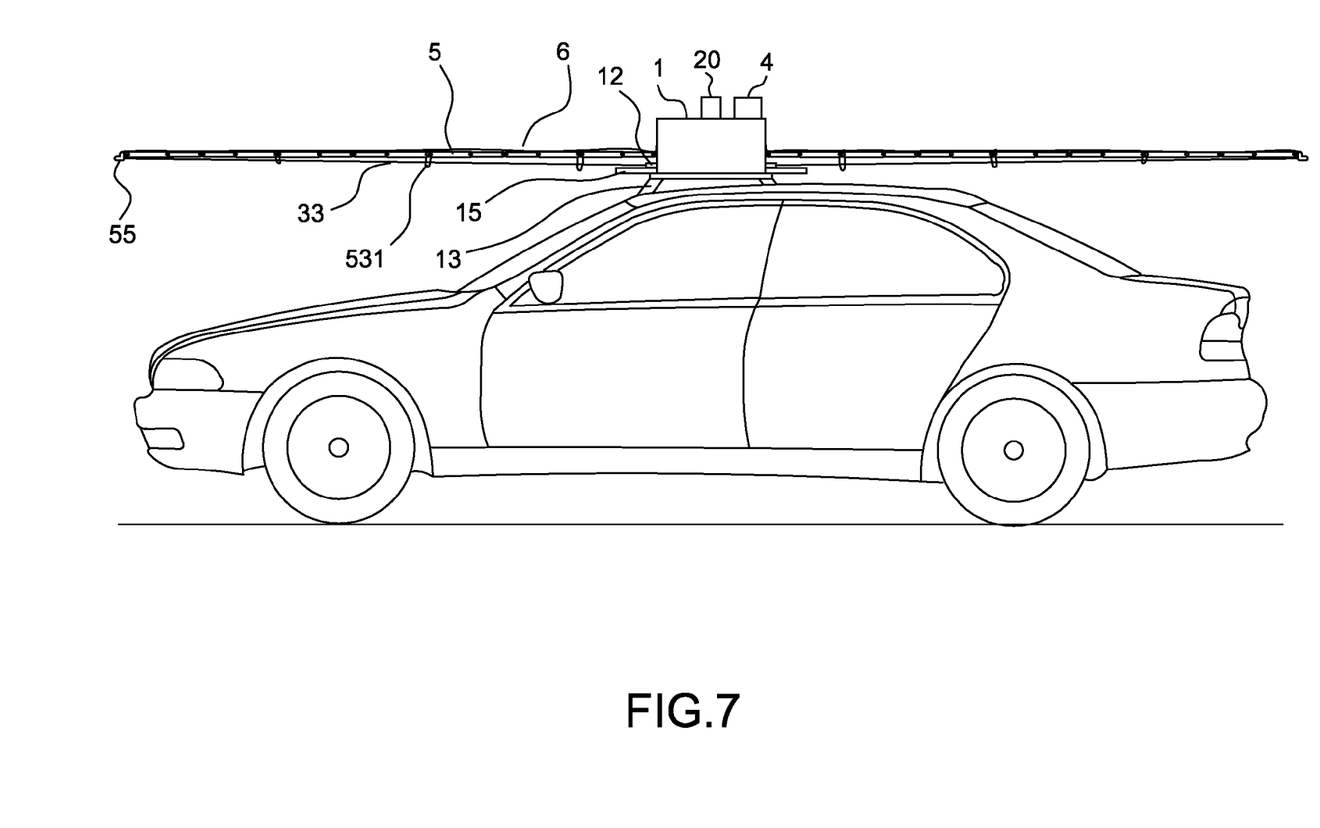
FIG. 7 is the side-view diagram to show the opening state of the first embodiment of the invention.
Figure 8:
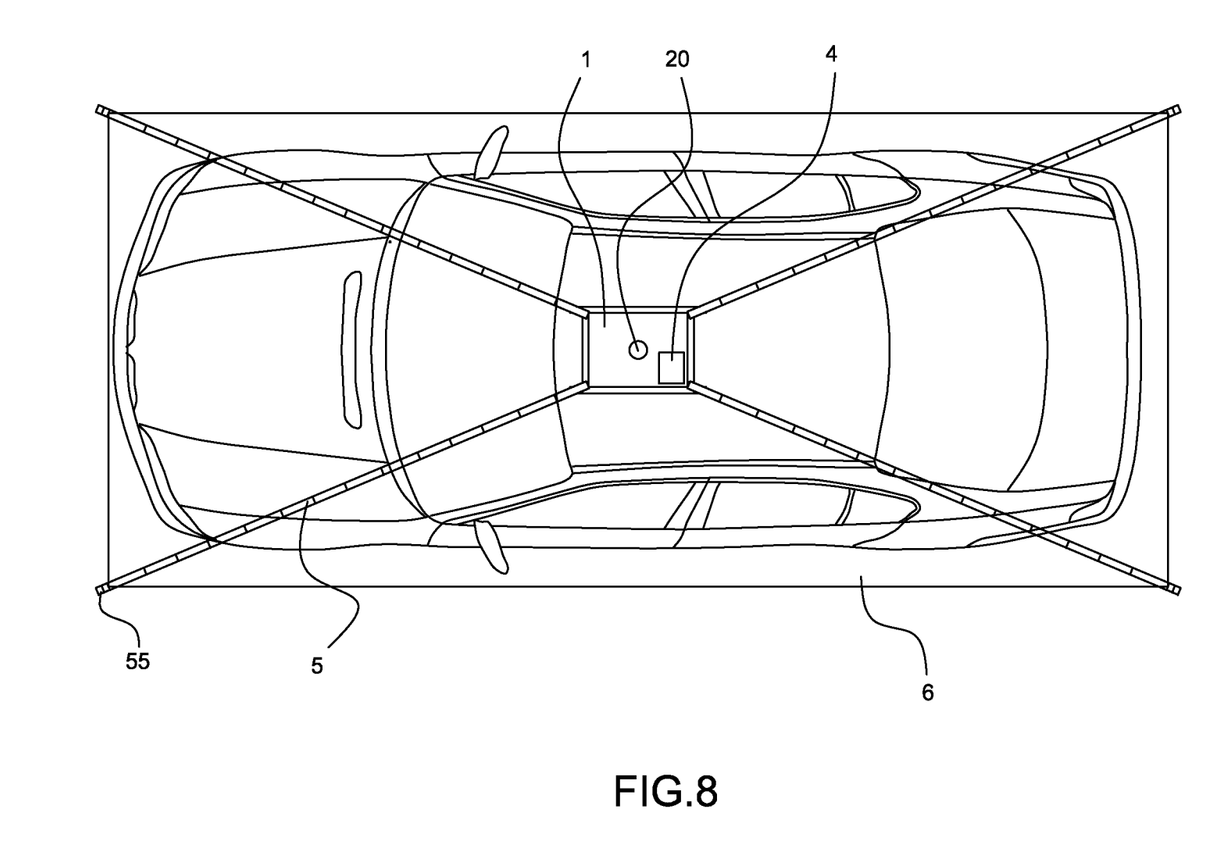
FIG. 8 is the top-view diagram to show the opening state of the first embodiment of the invention.

Please refer to FIG. 1 and FIG. 2 for the main structure of the first embodiment for the invention, which comprises: main unit 1, transmission component 2, passive component 3, link mechanism 5 and shield 6. The main unit 1 has a compartment 11. At each corner of the main unit 1 there is a conduit 12 to provide external connectivity for the compartment 11. At the bottom of the main unit 1 there is support frame 13 to support car top. At the peripheral of the main unit 1 there is a corresponding joint unit 14 on top and a placement unit 15 at bottom for each conduit 12. The transmission component 2 is located in the compartment 11 of the main unit 1. The transmission component 2 has at least one drive unit 21 (e.g. gear) driven by external power supply 20 (e.g. motor). On the main unit 1 there is a battery 4 as power supply 20. Multiple passive components 3 are located at the peripheral of the transmission component 2 in the compartment 11. On each passive component 3 there are at least one driven unit 31 and one wire duct 32. Each driven unit 31 (e.g. gear) combines with the drive unit 21 for synchronous movement. Each wire duct 32 is available for a flexible elastic cable 33 to wrap around. Each flexible elastic cable 33 has an active end 55 passing through a conduit 12 and extending to outside of the compartment 11. Each flexible elastic cable 33 is wrapped with flexible soft materials. Multiple link mechanisms 5 are composed of multiple longer first links 51 and multiple shorter second links 52. On the first link 51 there is a hollow accommodating unit 511 to allow connection with the second link 52 on the side of the accommodating unit 511. Further, the second link 52 is connected through a connecting component 54. Last, the first link 51 is connected through another connecting component 53. On connecting component 53 (on the side near the flexible elastic cable 33) there is a ring unit 531 that can be coupled with the flexible elastic cable 33. Thus, one end of the link mechanism 5 connects to the joint unit 14 of the main unit 1, while the other end of the link mechanism 5 is connected to the active end 55 of the flexible elastic cable 33. As a consequence, the link mechanism 5 is able to change length with the movement of the flexible elastic cable 33. The ring unit 531 can be coupled with the flexible elastic cable 33 to allow tight connection of the link mechanism 5 and the neighboring flexible elastic cable 33. In a real application, the outward extending portion of the flexible elastic cable 33 from the conduit 12 can be slightly shorter than the link mechanism 5. This allows a bending state of small jagged shape for the link mechanism 5 under the maximum extension state. After the flexible elastic cable 33 is rewound, the link mechanism 5 can be smoothly folded back. The shield 6 is a soft piece for shielding and attached to the multiple link mechanisms 5 and changes with the length of the link mechanism 5 to generate different coverage area.

Please refer to the figures from FIG. 3 to FIG. 8. It can be known that in a real application of the invention the main unit 1 is put on car top by a support frame 13. When the power supply 20 does not drive the transmission component 2, each flexible elastic cable 33 is rewound in the wire duct 32 and the link mechanism 5 is in a complete closing state (each second link 52 is stored in the accommodating unit 511 of the first link 51 in a minimum size). At this time, the shield 6 is in a compression state as the link mechanism 5 (as shown in figures from FIG. 3 to FIG. 5) above the placement unit 15. When the invention is in use, the power supply 20 and battery 4 connect to drive the movement of the transmission component 2 and accordingly each passive component 3 moves. Then each flexible elastic cable 33 extends out through the conduit 12 and engages the link mechanism 5 to open the shield 6 outward to form a shield above a car 9 (as shown in figures from FIG. 6 to FIG. 8). At the same time, the soft flexible material wrapping around flexible elastic cable 33 can effectively prevent scratch of car exterior finish during operation process.

In the above structure of the invention, a power switch can be installed on the main unit 1 to control the connection of the power supply 20 and the battery 4; or a remote control can be used to achieve operation control purpose.

Figure 9:
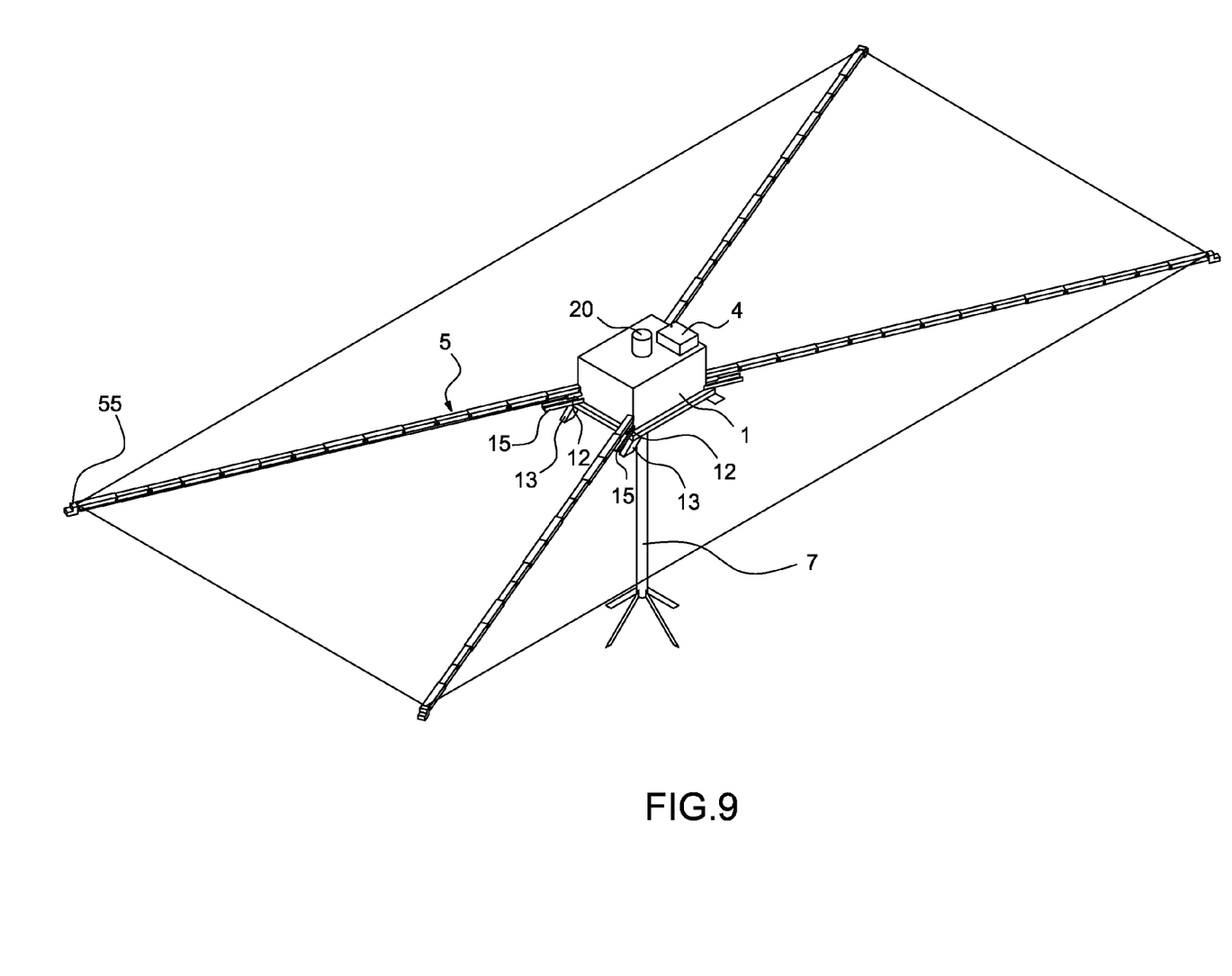
FIG. 9 is the structural diagram for the second embodiment of the invention.

From FIG. 9, it can be known that the second embodiment of the invention is based on the structure of the first embodiment and possesses the identical main unit 1, transmission component 2, passive component 3, link mechanism 5 and shield 6. The only difference lies in that on the bottom of the main unit 1 there is a tripod 7 against the ground to allow the formation of tent structure to shield predetermined space through synchronous movement of the shield 6 by the link mechanism 5.

From the above, it can be known that the improved structure for car cover in the invention indeed provides operational convenience and multiple functions. It has industrial utility, novelty and progressiveness.

The above mentioned is only one preferred embodiment of the invention and not intended to limit the scope of the invention. Those equivalent alteration and modification within the scope of the invention shall be covered by the claims.

What is claimed is:

1. An improved structure for car cover comprising:
   a main unit with a compartment and a conduit at each corner of the main unit to provide the compartment with external connectivity;
   a transmission component that can be driven by external power supply and is located inside the compartment of the main unit and has at least one drive unit that can be driven by the power supply;
   multiple passive components located at the peripheral of the transmission component inside the compartment, with at least one driven unit and one wire duct on each passive component and each driven unit being able to connect with the drive unit of the transmission component to move synchronously and wire duct being wrapped around by a flexible elastic cable that has an active end to pass through a conduit to the outside of the compartment;
   multiple link mechanisms provided in each conduit at each corner of the main unit, each mechanism having multiple longer first links and multiple shorter second links, wherein each longer first link and each shorter second link forming a pair of link mechanism in a repetitive bending fashion, being linked for extension and shrinkage of the car cover, through connecting one end to the main unit and the other end to an active end of different flexible elastic cables, enabling synchronous movement of the link mechanism by every flexible elastic cable and allowing extension and shrinkage in length, and
   a soft piece of shield that is attached to the multiple link mechanisms and able to varies with the length through extension and shrinkage of the multiple longer first links and multiple shorter second links of the multiple link mechanisms to change the coverage area.

2. As described in claim 1 of the invention for an improved structure for car cover, at the bottom of the main unit there is a tripod against the ground.

3. As described in claim 1 of the invention for an improved structure for car cover, at the bottom of the main unit there is a support frame against the car top.

4. As described in claim 1 of the invention for an improved structure for car cover, the main unit is equipped with a battery as power supply.

5. As described in claim 1 of the invention for an improved structure for car cover, the drive unit of the transmission component and the driven unit of each passive component are matching gears.

6. As described in claim 4 of the invention for an improved structure for car cover, the drive unit of the transmission component and the driven unit of each passive component are matching gears.

7. As described in claim 1 of the invention for an improved structure for car cover, the links of the link mechanism are arranged in a repetitive bending fashion, and between links there is a connecting component.

8. As described in claim 4 of the invention for an improved structure for car cover, wherein the links of the link mechanism are arranged in a repetitive bending fashion and between links there is a connecting component.

9. As described in claim 5 of the invention for an improved structure for car cover, wherein the links of the link mechanism are arranged in a repetitive bending fashion and between links there is a connecting component.

10. As described in claim 7 of the invention for an improved structure for car cover, the link mechanism is composed of multiple longer first links and multiple shorter second links, and in each first link there is a hollow accommodating unit to accommodate the second link forming a pair of link mechanism, wherein a plurality of link mechanism pairs are extendable and shrinkable in a repetitive bending fashion.

11. As described in claim 8 of the invention for an improved structure for car cover, the link mechanism is composed of multiple longer first links and multiple shorter second links, and in each first link there is a hollow accommodating unit to accommodate the second link.

12. As described in claim 9 of the invention for an improved structure for car cover, the link mechanism is composed of multiple longer first links and multiple shorter second links, and in each first link there is a hollow accommodating unit to accommodate the second link.

13. As described in claim 7 of the invention for an improved structure for car cover, on some of the connecting components close to the flexible elastic cable there is a ring unit, which is put on the flexible elastic cable.

14. As described in claim 8 of the invention for an improved structure for car cover, on some of the connecting components close to the flexible elastic cable there is a ring unit, which is put on the flexible elastic cable.

15. As described in claim 9 of the invention for an improved structure for car cover, on some of the connecting components close to the flexible elastic cable there is a ring unit, which is put on the flexible elastic cable.

16. As described in claim 10 of the invention for an improved structure for car cover, on some of the connecting components close to the flexible elastic cable there is a ring unit, which is put on the flexible elastic cable.

17. As described in claim 11 of the invention for an improved structure for car cover, on some of the connecting components close to the flexible elastic cable there is a ring unit, which is put on the flexible elastic cable.

18. As described in claim 12 of the invention for an improved structure for car cover, on some of the connecting components close to the flexible elastic cable there is a ring unit, which is put on the flexible elastic cable.

19. As described in claim 1 of the invention for an improved structure for car cover, the length of the outward extending flexible elastic cable from the conduit is shorter than the link mechanism.

\* \* \* \* \*